United States Patent
Telefus et al.

(10) Patent No.: US 9,660,544 B1
(45) Date of Patent: May 23, 2017

(54) SELF-DRIVEN SYNCHRONOUS RECTIFIER CIRCUIT

(71) Applicant: Flextronics AP, LLC, Broomfield, CO (US)

(72) Inventors: Mark Telefus, Orinda, CA (US); Peter Ramos Yeo, Quezon (PH); Bahman Sharifipour, Newington, NH (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 14/821,335

(22) Filed: Aug. 7, 2015

Related U.S. Application Data

(60) Provisional application No. 62/035,244, filed on Aug. 8, 2014.

(51) Int. Cl.
*H02M 3/335* (2006.01)

(52) U.S. Cl.
CPC .............................. *H02M 3/33592* (2013.01)

(58) Field of Classification Search
CPC ............. H02M 3/335; H02M 3/33507; H02M 3/3353; H02M 3/33523; H02M 3/33538; H02M 3/33546; H02M 3/33553; H02M 3/33569; H02M 3/33576; H02M 3/33592; H02M 3/1588; H02M 1/08; H02M 1/32; H02M 2001/0009; H02M 2001/0032; Y02B 70/1475; Y02B 70/1458
USPC ... 363/15–26, 44–48, 50, 52–54, 81, 84, 89, 363/123–127; 323/205–219, 222–226, 323/271–275, 282–289, 351; 327/419, 327/427–434
See application file for complete search history.

(56) References Cited

U.S. PATENT DOCUMENTS

| | | | |
|---|---|---|---|
| 4,607,323 A | 8/1986 | Sokal | |
| 5,838,556 A | 11/1998 | Yokoyama | |
| 6,256,214 B1* | 7/2001 | Farrington | H02M 1/38 363/127 |
| 6,466,460 B1 | 10/2002 | Rein | |
| 2010/0253310 A1 | 10/2010 | Fonderie | |
| 2012/0113692 A1 | 5/2012 | Telefus | |
| 2013/0108304 A1* | 5/2013 | Hayasaki | H02M 1/08 399/88 |

(Continued)

OTHER PUBLICATIONS

Claims of Copending U.S. Appl. No. 14/821,277 (Aug. 7, 2015).*

(Continued)

*Primary Examiner* — Timothy J Dole
*Assistant Examiner* — Carlos Rivera-Perez
(74) *Attorney, Agent, or Firm* — Haverstock & Owens LLP

(57) ABSTRACT

A power converter includes a self-driven circuit for appropriately turning ON and OFF a synchronous rectifier during the operating cycle of the power converter. Without the use of a smart controller coupled to the synchronous rectifier, the self-driven circuit turns ON the synchronous rectifier during the positive cycle of the power converter when the main switch is turned OFF, and the self-driven circuit turns OFF the synchronous rectifier during the negative cycle of the power converter when the main switch is turned ON. Unlike conventional self-driven circuits that include an auxiliary secondary winding for driving a synchronous rectifier, the self-driving circuitry of the present application does not include an auxiliary secondary winding.

12 Claims, 4 Drawing Sheets

(56) References Cited

U.S. PATENT DOCUMENTS

2013/0182462 A1* 7/2013 Sorge .................. H02M 1/083
                                                    363/21.02
2014/0211515 A1   7/2014 Tomioka et al.

OTHER PUBLICATIONS

Notice of Allowance, mailed Nov. 16, 2016, U.S. Appl. No. 14/470,771, filed Aug. 27, 2014, Applicant: Martin Zhang, 17 pages.

* cited by examiner

SELF-DRIVEN SYNCHRONOUS RECTIFIER CIRCUIT

RELATED APPLICATIONS

This Patent Application claims priority under 35 U.S.C. 119(e) of the U.S. Provisional Application, Ser. No. 62/035,244, filed Aug. 8, 2014, and entitled "ADAPTIVE SYNCHRONOUS RECTIFIER CIRCUIT". This application incorporates U.S. Provisional Application, Ser. No. 62/035,244 in its entirety by reference.

FIELD OF THE INVENTION

The present invention is generally directed to the field of power converters. More specifically, the present invention is directed to a power converter having an adaptive synchronous rectifier circuit.

BACKGROUND OF THE INVENTION

In many applications a power converter is required to provide an output voltage within a predetermined range formed from an output voltage source having a different voltage level. One very common type of power converter is a flyback type voltage converter.

FIG. 1 illustrates a conventional flyback type voltage converter. The converter 2 includes a transistor Q1, a controller 4, a transformer TX, a capacitor C1, and a diode D1. Input voltage to the circuit may be unregulated DC voltage derived from an AC supply after rectification and filtering. The transistor Q1 is a fast-switching device, such as a MOSFET, the switching of which is controlled by a fast dynamic controller 4 to maintain a desired output voltage Vout. The secondary winding voltage is rectified and filtered using the diode D1 and the capacitor C1. The transformer TX of the flyback converter functions differently than a typical transformer. Under load, the primary and secondary windings of a typical transformer conduct simultaneously. However, in the flyback converter, the primary and secondary windings of the transformer do not carry current simultaneously. In operation, when the transistor Q1 is turned ON, the primary winding of the transformer TX is connected to the input supply voltage such that the input supply voltage appears across the primary winding P1, resulting in an increase of magnetic flux in the transformer TX and the primary winding current Ipri rises linearly. However, with the transistor Q1 turned ON, the diode D1 is reverse biased and there is no secondary current Isec through the secondary winding S1. Even though the secondary winding S1 does not conduct current while the transistor Q1 is turned ON, the load, represented as resistor Rload, coupled to the capacitor C1 receives uninterrupted current due to previously stored charge on the capacitor C1.

When the transistor Q1 is turned OFF, the primary winding current path is broken and the voltage polarities across the primary and secondary windings reverse, making the diode D1 forward biased. As such, the primary winding current is interrupted but the secondary winding S1 begins conducting current thereby transferring energy from the magnetic field of the transformer TX to the output of the converter. This energy transfer includes charging the capacitor C1 and delivering energy to the load. If the OFF period of the transistor Q1 is sufficiently long, the secondary current Isec has sufficient time to decay to zero and the magnetic field energy stored in the transformer TX is completely dissipated.

The flyback topology has long been attractive because of its relative simplicity when compared with other topologies used in low power applications. A drawback of the flyback type converter, as with all power converters, is power loss incurred within the circuit. As such, a general goal in power converter circuit design is to minimize power loss. A primary source of power loss in the flyback type converter is the secondary side diode D1 because the diode D1 carries the entire secondary side current Isec. This source of power loss is not limited to flyback type converters, but to any power converter having a secondary side diode that carries secondary side current. By way of example, a conventional application for a flyback type converter is to convert AC wall voltage to a DC voltage for low power applications, such as 5V to charge a cellular telephone. In this case, the secondary side current is approximately 2 A resulting in output power of 10 W. For a conventional diode having a forward voltage of 0.7V, this results in power dissipation across the diode of 1.4 W, or 14% of the total power output.

Synchronous rectification is a technique for improving the efficiency of rectification by replacing diodes with actively controlled switches such as transistors, typically power MOSFETs or power BJTs. In the case of power converters, such as the flyback type converter of FIG. 1, a synchronous rectifier is implemented as a MOSFET that replaces the diode D1. FIG. 2 illustrates a conventional flyback type voltage converter implemented using synchronous rectification. The flyback type converter 4 of FIG. 2 is similar to the flyback type converter 2 of FIG. 1 except that the diode D1 of converter 2 is replaced by a synchronous rectifier, a transistor Q2. The diode D2 represents the intrinsic diode, also referred to as the parasitic or body diode, of the transistor Q2. The synchronous rectifier driver circuit first allows the body diode D2 to conduct then the transistor Q2 is turned ON. The synchronous rectifier is more efficient than a diode for conducting the secondary side current Isec. By way of example, the transistor Q2 implemented as a MOSFET has an on resistance Rdson of approximately 0.04 ohms. In the case of the 2 A secondary side current, the power dissipation across the transistor Q2 is $(Isec)^2(Rdson)$, which is approximately 0.16 W, significantly lower than the 1.4 W power dissipation across the diode D1 in FIG. 1.

An issue associated with using the synchronous rectifier is how to efficiently and economically turn ON the transistor Q2. The use of a synchronous rectifier driver circuit employs an additional secondary side winding that couples a primary side controller signal to synchronize the timing with the synchronous rectifier. FIG. 3 illustrates a conventional flyback type voltage converter implemented using synchronous rectification and a synchronous rectifier driver circuit. The flyback type converter 8 of FIG. 3 is similar to the flyback type converter 6 of FIG. 2 with the addition of a synchronous rectifier driver circuit. The synchronous rectifier driver circuit includes additional secondary winding S2, a diode D3 and a capacitor C2 configured to supply sufficient gate-to-source voltage Vgs to turn ON the transistor Q2 at an appropriate time during the power delivery cycle. The synchronous rectifier driver circuit is self driven to automatically drive the transistor Q2. The additional secondary winding S2 ensures that the secondary side control is in step with the primary side control. However, introduction of the additional secondary winding S2 increases the complexity of the transformer design.

A fundamental issue with a MOSFET is that it is not strictly a uni-directional current element when turned ON. Positive secondary current Isec or negative secondary current Isec can pass through the transistor Q2 when the transistor Q2 is turned ON depending on the voltage polarities. As such, the transistor Q2 can not simply be turned ON and left ON. When the primary side transistor Q1 is turned OFF, there is positive voltage across the secondary windings S1 and S2, which results in the transistor Q2 turning ON and positive secondary current Isec flowing from the secondary winding S1 through the transistor Q2 to the output capacitor C1 and the load Rload. However, when the primary side transistor Q1 is turned ON, there is negative voltage across the secondary windings S1 and S2. Negative voltage is not applied to the gate of transistor Q2 and the transistor is left "flying", or ON. The positive voltage across the output capacitor C1, which is supposed to provide current flow from the capacitor C1 to Rload during this period, instead flows through the turned ON transistor Q2 as negative secondary current Isec. In other words, the capacitor C1 discharges through the secondary winding S1 instead of the load. So, in this case, when turned ON the transistor Q2 functions as a bi-directional switch.

An approach for appropriately turning OFF the synchronous rectifier is to employ current detection to maintain an ON-state of the synchronous rectifier until the secondary current Isec reaches zero. Zero secondary current indicates a dead time period which is a signal to turn OFF the synchronous rectifier until the next cycle. FIG. 4 illustrates another conventional flyback type voltage converter implemented using synchronous rectification and a synchronous rectifier driver circuit. The flyback type converter 9 of FIG. 4 is similar to the flyback type converter 6 of FIG. 2 with the addition of a synchronous rectifier driver circuit. The synchronous rectifier driver circuit 9 uses current detection and includes a resistor R1 added into the secondary current path. A comparator 7 measures the voltage across the resistor R1 against a reference value and outputs the difference to a controller 5. When the controller 5 determines zero voltage across the resistor R1, which corresponds to zero secondary current, an output of the controller 5 triggers a turn OFF signal to the synchronous rectifier Q3.

Other techniques that use current detection configure an additional secondary winding in series with the synchronous rectifier, in contrast to the parallel configuration shown in FIG. 3. A series configuration reduces circuit complexity but does not completely alleviate the increased complexity of the transformer due to the additional secondary winding.

Another approach for appropriately turning OFF the synchronous rectifier is to employ voltage detection across the drain-to-source of the synchronous rectifier. The drain-to-source voltage Vds can be detected using sensing circuit that includes a differential amplifier coupled to the drain and the source of the synchronous rectifier. When the sensing circuit detects that the voltage Vds is low, the sensing circuit sends a signal to a driving circuit to turn ON the synchronous rectifier until a reverse biased condition is determined in the differential amplifier, at which point the driving circuit is signaled to turn OFF the synchronous rectifier. Although effective, such a configuration needs current build up to drive the synchronous rectifier, which results in a delay during turn ON. Each of the conventional approaches that use either current or voltage detection also use the additional secondary winding.

Additional circuit complexity is also needed to properly time turning ON the synchronous rectifier. Care must be taken to avoid turning ON the intrinsic diode, such as the diode D2 in FIG. 3, before the synchronous rectifier turns ON. The intrinsic diode has a similar power loss as a stand-alone diode. If the intrinsic diode turns ON and conducts, the purpose of using the synchronous rectifier instead of a stand-alone diode is defeated. Such timing circuitry is typically included between any sensing circuitry and the synchronous rectifier.

SUMMARY OF THE INVENTION

A power converter includes a self-driven circuit for appropriately turning ON and OFF a synchronous rectifier during the operating cycle of the power converter. Without the use of a smart controller coupled to the synchronous rectifier, the self-driven circuit turns ON the synchronous rectifier during the positive cycle of the power converter when the main switch is turned OFF, and the self-driven circuit turns OFF the synchronous rectifier during the negative cycle of the power converter when the main switch is turned ON. Unlike conventional self-driven circuits that include an auxiliary secondary winding for driving a synchronous rectifier, the self-driving circuitry of the present application does not include an auxiliary secondary winding.

In an aspect, a power converter comprises a transformer, a main switch, a controller, a synchronous rectifier, an output capacitor and a self-driven driving circuit. The transformer has a primary winding coupled to an input supply voltage and a secondary winding. The main switch is coupled in series to the primary winding. The controller is coupled to the main switch. The synchronous rectifier is coupled to the secondary winding. The output capacitor is coupled to the secondary winding and the synchronous rectifier. The self-driven driving circuit is coupled to the secondary winding and the synchronous rectifier. The self-driven driving circuit is configured to turn ON the synchronous rectifier when the main switch is OFF, and is configured to turn OFF the synchronous rectifier when the main switch is ON.

In some embodiments, the self-driven driving circuit comprises a self driven detection circuit coupled to the secondary winding, wherein the self-driven detection circuit is configured to turn ON when the main switch is OFF and is configured to turn OFF when the main switch is ON, and a drive block coupled to the self-driven detection circuit and the synchronous rectifier, wherein the drive block is configured to turn ON when the self-driven detection circuit turns ON thereby turning ON the synchronous rectifier, and the drive block is configured to turn OFF when the self-driven detection circuit turns OFF thereby turning OFF the synchronous rectifier. In some embodiments, the self-driven detection circuit comprises a first diode, further wherein the transformer and the first diode are configured such that when the main switch is turned ON, the first diode is reverse biased thereby turning OFF the self-driven detection circuit and the drive block which turns OFF the synchronous rectifier. In some embodiments, the self-driven detection circuit further comprises a first transistor coupled in series with the first diode, further wherein the first transistor is non-conducting when the first diode is reverse biased. In some embodiments, the first diode is reverse biased when the main switch is turned ON and the first diode is forward biased when the main switch is turned OFF. In some embodiments, the self-driven detection circuit further comprises a resistor, wherein the resistor is coupled to a positive terminal of the secondary winding, the resistor is coupled in series with the first transistor, the first transistor is coupled in series with the first diode, and the first diode is coupled to a negative terminal of the secondary winding. In some embodiments, the first transistor comprises a N-channel MOSFET, further wherein a source of the first transistor is coupled to an anode of the first diode, a gate of the first transistor is coupled to the drive block, a drain of the first transistor is coupled to the resistor, and a cathode of the first diode is coupled to the negative terminal of the secondary winding. In some embodiments, the drive block comprises a second diode, a second transistor coupled to the second diode, a third transistor coupled to the second transistor and a fourth transistor coupled to the third transistor. In some embodiments, the second transistor and the third transistor are coupled to the synchronous rectifier, and the fourth transistor is coupled to ground. In some embodiments, the second diode is coupled to a positive terminal of the secondary winding. In some embodiments, the second transistor comprises a P-channel MOSFET and the third transistor is a N-channel MOSFET. In some embodiments, the fourth transistor comprises a NPN bi-polar junction transistor. In some embodiments, the second diode and the fourth transistor function as bias for proper operation of the third transistor in the linear region and the second transistor as a switch for turning ON and OFF the synchronous rectifier.

In another aspect, a power converter comprising a transformer, a main switch, a controller, a synchronous rectifier, an output capacitor, a self-driven detection circuit and a drive block. The transformer has a primary winding coupled to an input supply voltage and a secondary winding. The main switch is coupled in series to the primary winding. The controller is coupled to the main switch. The synchronous rectifier is coupled to the secondary winding. The output capacitor is coupled to the secondary winding and the synchronous rectifier. The self-driven detection circuit is coupled to the secondary winding. The self-driven detection circuit comprises a resistor, a first transistor and a first diode, wherein the resistor is coupled to a positive terminal of the secondary winding, the resistor is coupled in series with the first transistor, the first transistor is coupled in series with the first diode, and the first diode is coupled to a negative terminal of the secondary winding. The first transistor is configured to turn ON when the main switch is OFF and is configured to turn OFF when the main switch is ON. The drive block comprises a second diode coupled to the positive terminal of the secondary winding, a second transistor coupled to the second diode, a third transistor coupled to the second transistor and a fourth transistor coupled to the third transistor and to ground. The first transistor of the self-driven detection block is coupled to drive the second transistor of the drive block, and the second transistor is coupled to drive the synchronous rectifier such that the second transistor of the drive block is configured to turn ON when the first transistor of the self-driven detection circuit turns ON thereby turning ON the synchronous rectifier, and the second transistor of the drive block is configured to turn OFF when the first transistor of the self-driven detection circuit turns OFF thereby turning OFF the synchronous rectifier.

BRIEF DESCRIPTION OF THE DRAWINGS

Several example embodiments are described with reference to the drawings. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of an adaptive synchronous rectifier (ASR) circuit have a self driven synchronous rectifier design for low power adapter applications. In some embodiments, the design is a discrete implementation for discontinuous flyback topology. In some embodiments, the synchronous rectifier is coupled to an output ground rail that utilizes a MOSFET instead of bipolar junction transistor (BJT) for lower standby consumption and faster switching.

Figure 1:
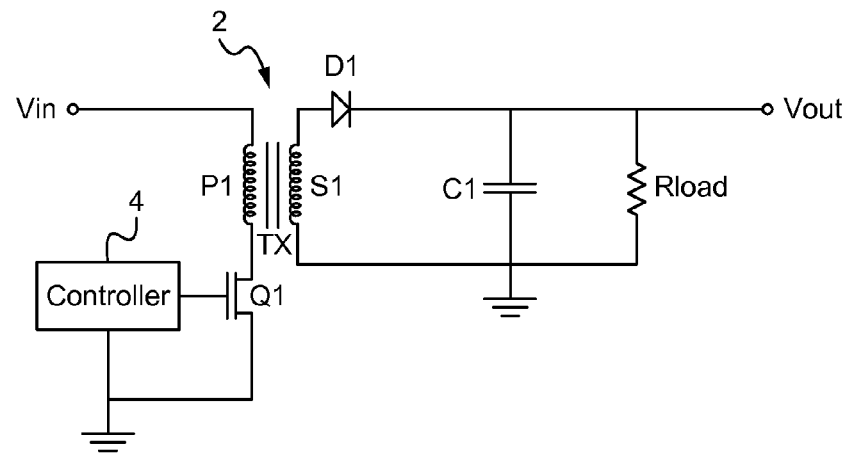
FIG. 1 illustrates a conventional flyback type voltage converter.
Figure 2:
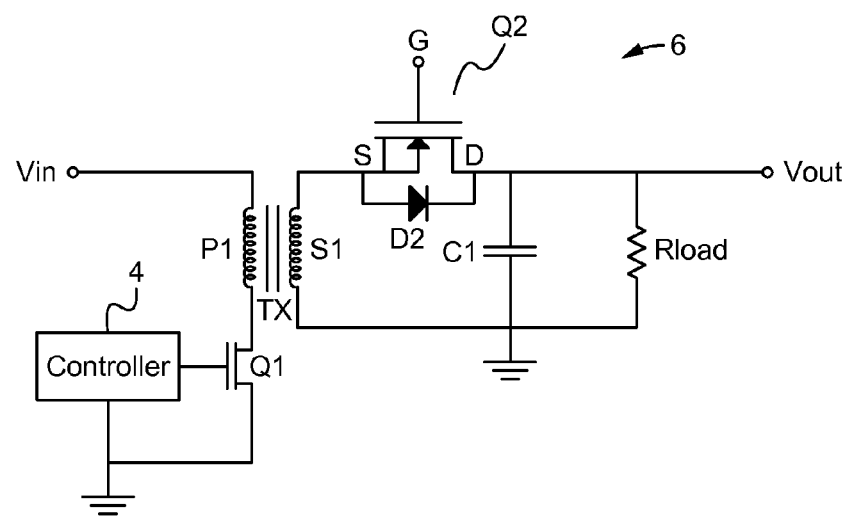
FIG. 2 illustrates a conventional flyback type voltage converter implemented using synchronous rectification.
Figure 3:
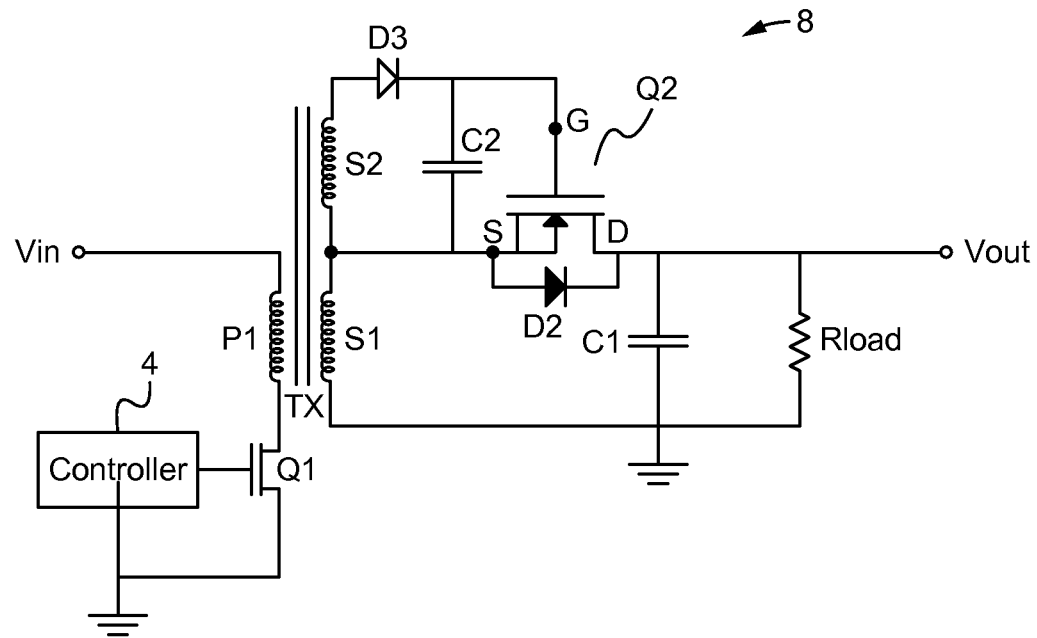
FIG. 3 illustrates a conventional flyback type voltage converter implemented using synchronous rectification and a synchronous rectifier driver circuit.
Figure 4:
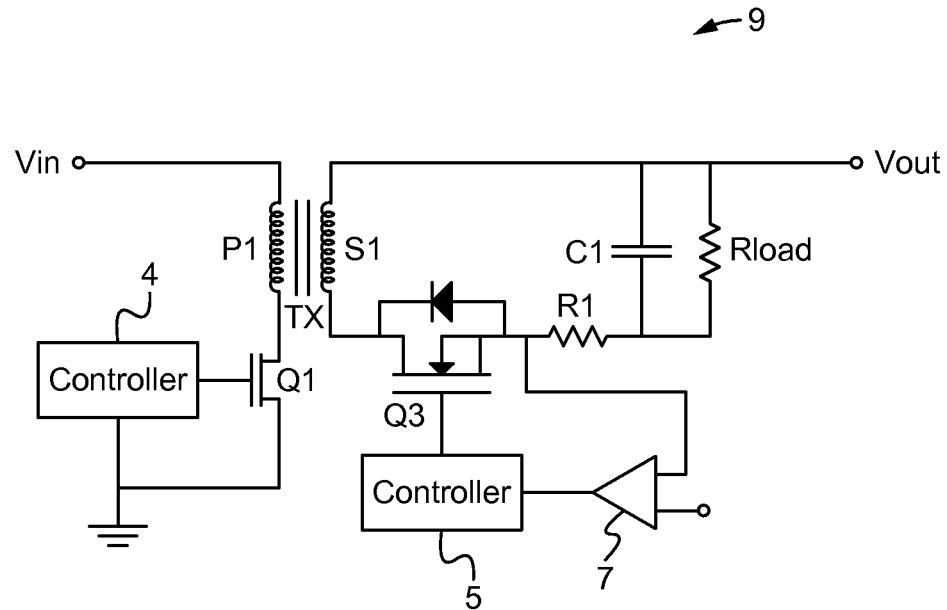
FIG. 4 illustrates another conventional flyback type voltage converter implemented using synchronous rectification and a synchronous rectifier driver circuit.
Figure 5:
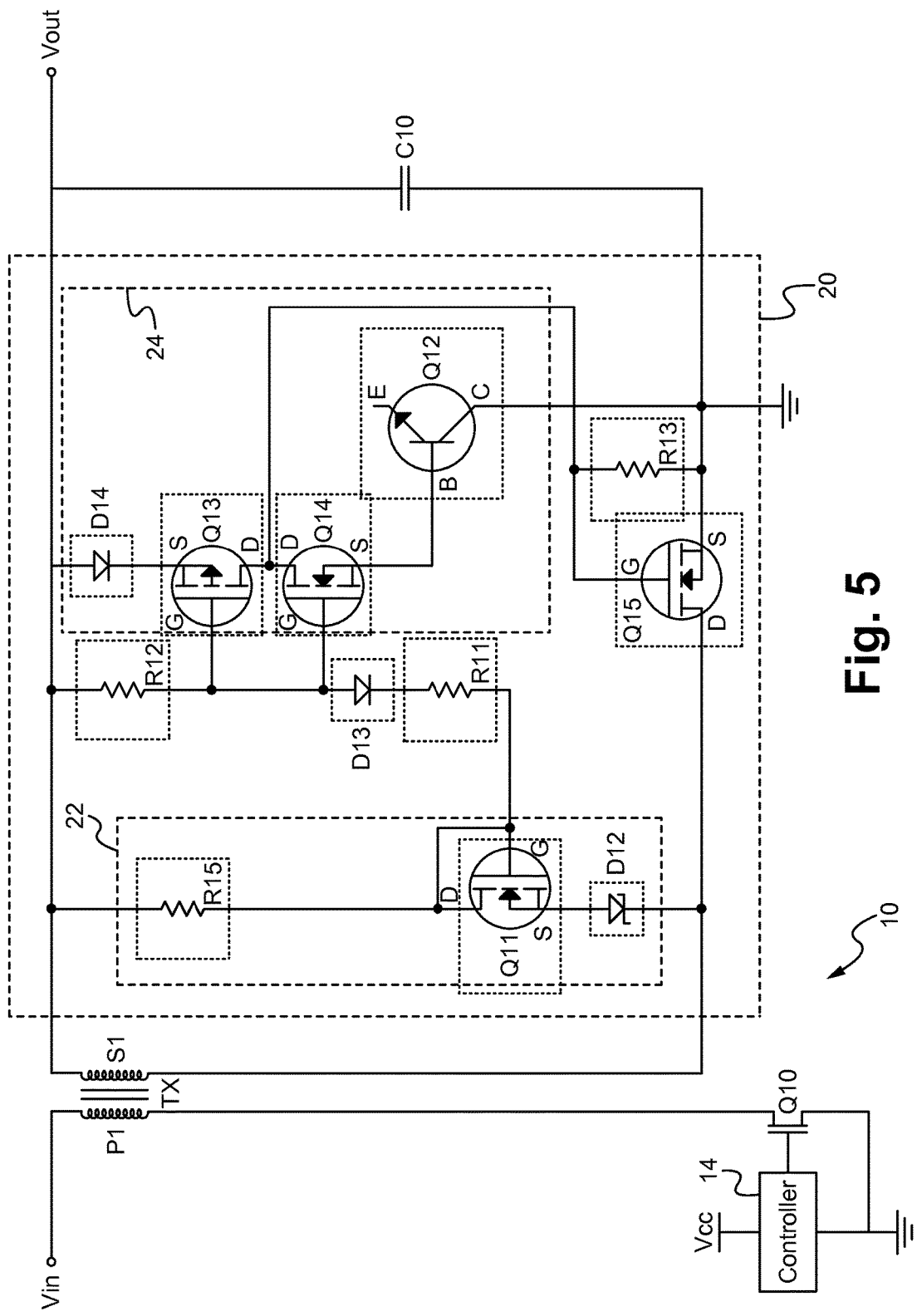
FIG. 5 illustrates a power converter including an adaptive synchronous rectifier circuit according to an embodiment.

FIG. 5 illustrates a power converter including an adaptive synchronous rectifier circuit according to an embodiment. In the exemplary configuration shown in FIG. 5, the adaptive synchronous rectifier circuit is implement as part of a flyback type voltage converter. It is understood that the adaptive synchronous rectifier circuit can be implemented as part of alternative types of power converters. The power converter 10 includes a transistor Q10, a controller 14, a transformer TX, a capacitor C10, and adaptive synchronous rectifier circuit 20. Input voltage to the circuit may be unregulated DC voltage derived from an AC supply after rectification and filtering. The transistor Q10 is a fast-switching device, such as a MOSFET, the switching of which is controlled by a fast dynamic controller 14 to maintain a desired output voltage Vout. The secondary winding voltage is rectified and filtered using the adaptive synchronous rectifier circuit 20 and the capacitor C10.

The adaptive synchronous rectifier circuit 20 includes two blocks, a current sense block 22 and a drive block 24. The current sense block 22 is a series connection of a resistor R15, a transistor Q11 and a diode D12 connected across the secondary winding S1 of the transformer TX. In some embodiments, the transistor Q11 is a N-channel MOSFET. The diode D12 is coupled to the transistor Q11 as a bias to properly operate the drive block 24 while the resistor R15 functions as a load.

The drive block 24 includes a diode 14 a transistor Q12, a transistor Q13 and a transistor Q14. In some embodiments, the transistors Q13 and Q14 are complementary MOSFETs, with the diode D14 coupled in series to the P-channel MOSFET Q13, and the transistor Q12 is an NPN BJT coupled in series to the N-channel MOSFET Q14. The diode D14 and the transistor Q12, with its forward diode voltage drop, function as bias for proper operation of the transistor Q14 in the linear region and the transistor Q13 as a switch. The drive block 24 is connected across the positive terminal of the secondary winding S1 to ground.

The adaptive synchronous rectifier circuit 20 also includes a resistor R12, a diode D13 and a resistor R11 coupled in series across the positive terminal of the secondary winding S1 to the gate of the transistor Q11. The gates of the transistors Q13 and Q14 are biased by the pull-up resistor R12. The current sense block 22 and the drive block 24 are connected by the series resistor R11 and diode D13.

The adaptive synchronous rectifier circuit 20 also includes a synchronous rectifier Q15. In some embodiments, the synchronous rectifier Q15 is a N-channel MOSFET. The drain of the synchronous rectifier MOSFET Q15 is connected to the negative terminal of the secondary winding S1. The gate of the synchronous rectifier MOSFET Q15 is connected to the drains of the P-channel MOSFET Q13 and the N-channel MOSFET Q14. The source of the synchronous rectifier MOSFET Q15 is connected to ground. The gate to drain voltage of the synchronous rectifier MOSFET Q15 is pulled down by a resistor R13. During start-up, the resistor R13 ensures that the synchronous rectifier MOSFET Q15 is turned OFF and enables the body diode of the synchronous rectifier MOSFET Q15 to conduct when the gate drive voltage is not yet present.

The power converter 10 cycles through a power conversion cycle by cycling the main switch, transistor Q10, ON and OFF. During the positive cycle corresponding to the transistor Q10 turned OFF the energy stored in the primary winding P1 is transferred to a load coupled at the power converter output across the output capacitor C10. When the transistor Q10 is turned OFF, the negative terminal of the secondary winding S1 is negative in polarity and the diode D12 is forward biased which turns ON the transistor Q11 and pulls down the gate voltage of the transistors Q13 and Q14 through the series connection of the resistor R11 and the diode D13. The voltage applied to the gates of the transistors Q13 and Q14 is set by the voltage divider formed by the resistors R11 and R12. When sufficient gate voltage is supplied, the transistor Q13 turns ON and the transistor Q14 goes into weak inversion. Turning ON the transistor Q13 enables sufficient gate voltage to turn ON the synchronous rectifier Q15. Turning ON the synchronous rectifier Q15 enables a current loop including the secondary winding S1, the output capacitor C10 and the synchronous rectifier Q15, thereby delivering power stored in the secondary winding S1 to the load. This condition continues until the secondary current through the secondary winding S1 is near zero and until the current sense block 22 turns OFF. The resistor R11 and the diode D13 are then pulled-up by the resistor R15 thus stopping current conduction through the diode D13. The transistor Q13 then gradually turns OFF through pull-up resistor R12. The value of the resistor R12 is based on the required time to turn OFF the transistor Q13 depending on the operating frequency of the transistor Q10. Turning OFF the transistor Q13 results in turning OFF the synchronous rectifier Q15.

During the negative cycle corresponding to the transistor Q10 turned ON, the negative terminal of the secondary winding S1 is positive in polarity and the diode D12 is reversed biased keeping the transistor Q11 OFF. The current sense block 22 and drive block 24 circuit remain turned OFF, and therefore the synchronous rectifier Q15 remains turned OFF, until the next positive cycle which reverses the polarity at the negative terminal of the secondary winding S1 and forward biases the diode D13 to turn ON the drive block 24, which turns ON the synchronous rectifier Q15, and the cycle repeats itself.

In this manner, the ASR circuit 20 functions as a self-driving circuit for appropriately turning ON and OFF the synchronous rectifier Q15 during the operating cycle of the power converter. Without the use of a smart controller coupled to the synchronous rectifier Q15, the ASR circuit 20 turns ON the synchronous rectifier Q15 during the positive cycle of the power converter when the main switch, transistor Q10, is turned OFF, and the ASR circuit 20 turns OFF the synchronous rectifier Q15 during the negative cycle of the power converter when the main switch, transistor Q10, is turned ON. Unlike conventional self-driven circuits that include an auxiliary secondary winding for driving a synchronous rectifier, the self-driving circuitry of the ASR circuit 20 does not include an auxiliary secondary winding.

The configuration of the ASR circuit 20 also enables an adaptive response to a changing load condition at the output. In particular, the ASR circuit 20 adapts to a no load condition by turning OFF the synchronous rectifier Q15. It is understood that when a load is removed from the output of the power converter the output voltage level spikes above the regulated output voltage level. For example, if the regulated output voltage level is 5.0V, removal of a load coupled to the power converter output results in an output voltage level spike to about 5.6V to 5.7V. The spiked output voltage level is a known, predetermined value for a given regulated output voltage level. Knowing this spiked output voltage level, the resistor R12, the diode D13, the resistor R11 and the resistor R15 are designed such that when the load is removed and the spiked output voltage level occurs, the transistor Q11 and the transistor Q13 turn OFF, thereby turning OFF the synchronous rectifier Q15. Upon reconnecting of the load to the power converter output, the output voltage level returns to the regulated output voltage level, and the ASR circuit 20 operates according to the positive and negative cycles corresponding to the transistor Q10, as described above. In this regard, the ASR circuit 20 is again self-driven in that it adapts to the load condition without use of a smart controller for turning ON and OFF the synchronous rectifier Q15.

Figure 6:
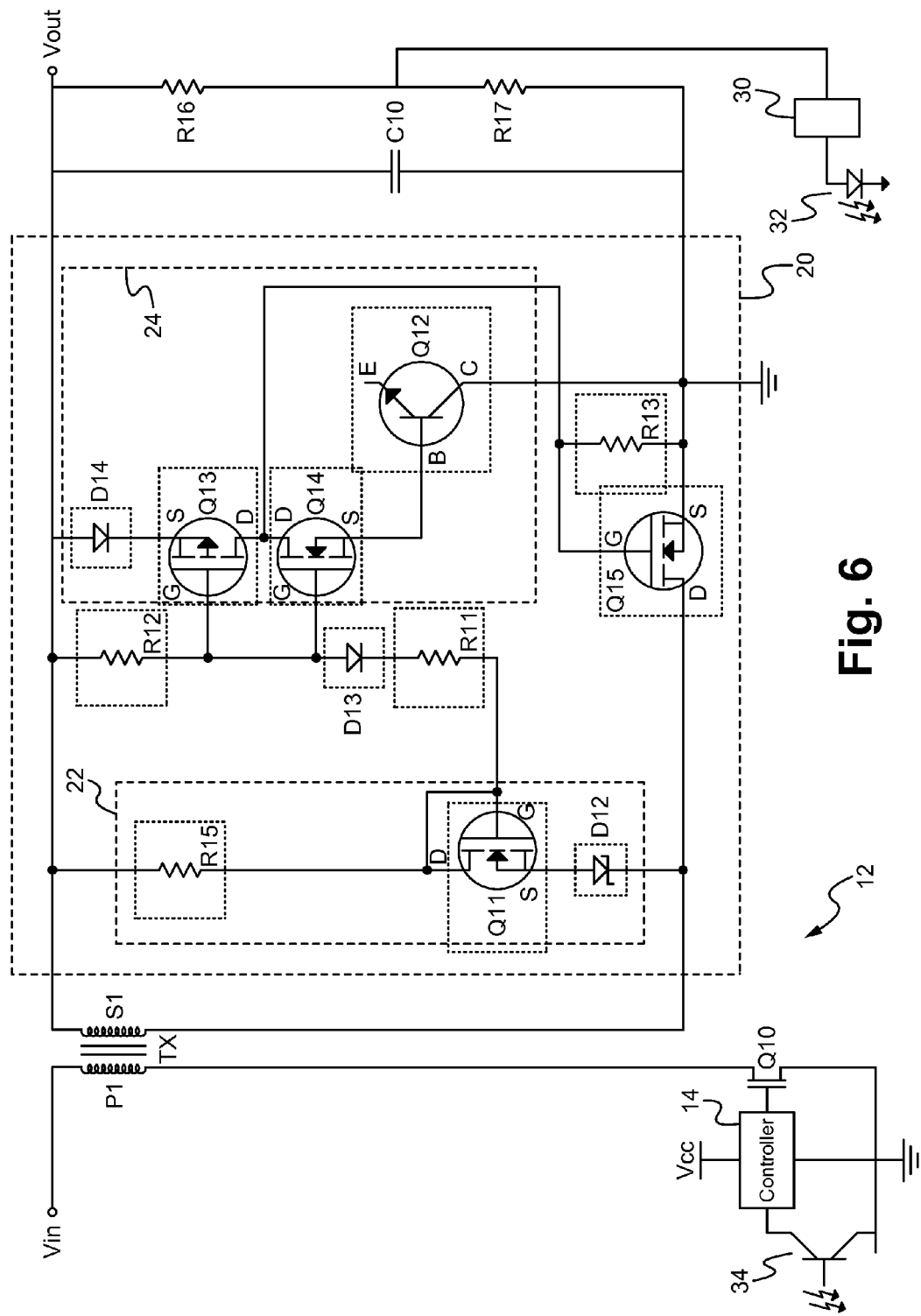
FIG. 6 illustrates a power converter including an adaptive synchronous rectifier circuit and feedback control according to an embodiment.

In the exemplary configuration shown in FIG. 5, the adaptive synchronous rectifier circuit is implement as part of a flyback type voltage converter. In general, the adaptive synchronous rectifier circuit can be implemented in power converters to replace secondary side diodes used to restrict the flow direction of secondary side current. Such configurations can include power converter types other than flyback type converters, as well as those configurations that include feedback control for regulating the output voltage. FIG. 6 illustrates a power converter including an adaptive synchronous rectifier circuit and feedback control according to an embodiment. The power converter 12 of FIG. 6 is similar to that of the power converter 10 of FIG. 5 with the addition of a feedback control circuit. The feedback control circuit includes a voltage divider comprising resistors R16 and R17, a secondary controller 30 and an optical coupler circuit. The secondary controller 30 may simply be a voltage sensing circuit. The optical coupler circuit includes two galvanically isolated components, an optical diode 32 coupled to the secondary controller 30 and an optical transistor 34 coupled to the controller 14. The optical diode 32 provides optical communication with the optical transistor 34 across the isolation barrier formed by the transformer TX. The optical coupler circuit in cooperation with the secondary controller 30 provides feedback to the controller 14. The controller 14 accordingly adjusts the duty cycle of the transistor Q10 to compensate for any variances in an output voltage Vout.

The exemplary power converter shown in FIG. 6 implements an optical coupler circuit for feedback control. It is understood that the adaptive synchronous rectifier circuit can be implemented in power converters having alternative types of feedback control.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power converter comprising:
  a. a transformer having a primary winding coupled to an input supply voltage and a secondary winding;
  b. a main switch coupled in series to the primary winding;
  c. a controller coupled to the main switch;
  d. a synchronous rectifier having a first terminal in direct electrical contact with a negative terminal of the secondary winding;
  e. an output capacitor having a first terminal in direct electrical contact with a positive terminal of the secondary winding and having a second terminal in direct electrical contact with a second terminal of the synchronous rectifier;
  f. a self-driven detection circuit coupled to the secondary winding, wherein the self-driven detection circuit is configured to turn ON when the main switch is OFF and is configured to turn OFF when the main switch is ON, further wherein the self-driven detection circuit comprises a first diode and a first transistor, wherein a cathode of the first diode is in direct electrical contact with the negative terminal of the secondary winding and the first terminal of the synchronous rectifier, an anode of the first diode is in direct electrical contact with a first terminal of the first transistor, and a second terminal of the first transistor is coupled to the positive terminal of the secondary winding;
  g. a first resistor having a first terminal in direct electrical contact with a third terminal of the first transistor;
  h. a second diode having a cathode an in direct electrical contact with a second terminal of the first resistor;
  i. a drive block coupled to the self-driven detection circuit and the synchronous rectifier, wherein the drive block is configured to turn ON when the self-driven detection circuit turns ON thereby turning ON the synchronous rectifier, and the drive block is configured to turn OFF when the self-driven detection circuit turns OFF thereby turning OFF the synchronous rectifier, further wherein the drive block comprises a third diode, a second transistor, a third transistor and a fourth transistor, an anode of the third diode in direct electrical contact with the positive terminal of the secondary winding, a cathode of the third diode in direct electrical contact with a first terminal of the second transistor, a first terminal of the third transistor in direct electrical contact with the fourth transistor, a second terminal of the second transistor in direct electrical contact with a second terminal of the third transistor and in direct electrical contact with a third terminal of the synchronous rectifier, a third terminal of the second transistor in direct electrical contact with a third terminal of the third transistor and in direct electrical contact with an anode of the second diode, and the fourth transistor in direct electrical contact with the second terminal of the synchronous rectifier and in direct electrical contact with ground.

2. The power converter of claim 1 wherein the transformer and the first diode are configured such that when the main switch is turned ON, the first diode is reverse biased thereby turning OFF the self-driven detection circuit and the drive block which turns OFF the synchronous rectifier.

3. The power converter of claim 2 wherein the first transistor is non-conducting when the first diode is reverse biased.

4. The power converter of claim 3 wherein the first diode is reverse biased when the main switch is turned ON and the first diode is forward biased when the main switch is turned OFF.

5. The power converter of claim 3 wherein the self-driven detection circuit further comprises a second resistor, wherein a first terminal of the second resistor is in direct electrical contact with the positive terminal of the secondary winding, and a second terminal of the second resistor is in direct electrical contact with the second terminal of the first transistor.

6. The power converter of claim 5 wherein the first transistor comprises a N-channel MOSFET, further wherein the first terminal of the first transistor is a source of the first transistor, the third terminal of the first transistor is a gate of the first transistor, and the second terminal of the first transistor is a drain of the first transistor.

7. The power converter of claim 6 wherein the second transistor is a P-channel MOSFET and the third transistor is a N-channel MOSFET.

8. The power converter of claim 7 wherein the fourth transistor is a NPN bi-polar junction transistor.

9. The power converter of claim 5 further comprises a third resistor, wherein a first terminal of the third resistor is in direct electrical contact with the positive terminal of the secondary winding, and a second terminal of the third resistor is in direct electrical contact with the third terminal of the second transistor, in direct electrical contact with the third terminal of the third transistor and in direct electrical contact with the anode of the second diode.

10. The power converter of claim 1 wherein the second diode and the fourth transistor function as bias for proper operation of the third transistor in the linear region and the second transistor as a switch for turning ON and OFF the synchronous rectifier.

11. The power converter of claim 1 wherein a first terminal of the fourth transistor is in direct electrical contact with the second terminal of the synchronous rectifier and in direct electrical contact with ground, a second terminal of the fourth transistor is open, and a third terminal of the fourth transistor is in direct electrical contact with the first terminal of the third transistor.

12. A power converter comprising:
   a. a transformer having a primary winding coupled to an input supply voltage and a secondary winding;
   b. a main switch coupled in series to the primary winding;
   c. a controller coupled to the main switch;
   d. a synchronous rectifier having a first terminal in direct electrical contact with a negative terminal of the secondary winding;
   e. an output capacitor having a first terminal in direct electrical contact with a positive terminal of the secondary winding and having a second terminal in direct electrical contact with a second terminal of the synchronous rectifier;
   f. a self-driven detection circuit coupled to the secondary winding, wherein the self-driven detection circuit comprises a first diode and a first transistor, wherein a cathode of the first diode is in direct electrical contact with the negative terminal of the secondary winding and the first terminal of the synchronous rectifier, an anode of the first diode is in direct electrical contact with a first terminal of the first transistor, and a second terminal of the first transistor is coupled to the positive terminal of the secondary winding, wherein the first transistor is configured to turn ON when the main switch is OFF and a secondary current through the secondary winding is greater than zero, and the first transistor is configured to turn OFF when the main switch is ON or when the main switch is OFF and the secondary current is zero;
   g. a first resistor having a first terminal in direct electrical contact with a third terminal of the first transistor;
   h. a second diode having a cathode in direct electrical contact with a second terminal of the first resistor;
   i. a drive block comprising a third diode, a second transistor, a third transistor and a fourth transistor, an anode of the third diode in direct electrical contact with the positive terminal of the secondary winding, a cathode of the third diode in direct electrical contact with a first terminal of the second transistor, a first terminal of the third transistor in direct electrical contact with the fourth transistor, a second terminal of the second transistor in direct electrical contact with a second terminal of the third transistor and in direct electrical contact with a third terminal of the synchronous rectifier, a third terminal of the second transistor in direct electrical contact with a third terminal of the third transistor and in direct electrical contact with an anode of the second diode, and the fourth transistor in direct electrical contact with the second terminal of the synchronous rectifier and in direct electrical contact with ground, further wherein the first transistor of the self-driven detection block is coupled to drive the second transistor of the drive block, and the second transistor is coupled to drive the synchronous rectifier such that the second transistor of the drive block is configured to turn ON when the first transistor of the self-driven detection circuit turns ON thereby turning ON the synchronous rectifier, and the second transistor of the drive block is configured to turn OFF when the first transistor of the self-driven detection circuit turns OFF thereby turning OFF the synchronous rectifier and disabling negative secondary current from flowing through the synchronous rectifier.

* * * * *